US009133032B2

(12) United States Patent
Smith et al.

(10) Patent No.: US 9,133,032 B2
(45) Date of Patent: Sep. 15, 2015

(54) FINE-GRAINED TARGETS FOR LASER SYNTHESIS OF CARBON NANOTUBES

(75) Inventors: Michael W. Smith, Newport News, VA (US); Cheol Park, Yorktown, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 731 days.

(21) Appl. No.: 12/851,584

(22) Filed: Aug. 6, 2010

(65) Prior Publication Data

US 2012/0032375 A1     Feb. 9, 2012

(51) Int. Cl.
*B29C 43/02* (2006.01)
*C01B 31/02* (2006.01)
*B82Y 30/00* (2011.01)
*B82Y 40/00* (2011.01)

(52) U.S. Cl.
CPC ............ *C01B 31/0233* (2013.01); *B82Y 30/00* (2013.01); *B82Y 40/00* (2013.01)

(58) Field of Classification Search
CPC ........ B29C 43/02; B29C 35/00; B29C 67/24; C09K 3/00
USPC .................................................. 264/319, 400
See application file for complete search history.

(56) References Cited

U.S. PATENT DOCUMENTS

| | | | |
|---|---|---|---|
| 6,517,800 B1 * | 2/2003 | Cheng et al. | 423/447.1 |
| 7,582,274 B2 * | 9/2009 | Cossement et al. | 423/447.3 |
| 7,692,116 B1 * | 4/2010 | Holloway et al. | 219/121.86 |
| 2002/0081380 A1 * | 6/2002 | Dillon et al. | 427/249.1 |
| 2003/0124717 A1 * | 7/2003 | Awano et al. | 435/287.2 |
| 2004/0057893 A1 * | 3/2004 | Okubo et al. | 423/439 |
| 2006/0121279 A1 * | 6/2006 | Petrik | 428/403 |
| 2007/0025905 A1 * | 2/2007 | Azami et al. | 423/447.2 |
| 2007/0169702 A1 * | 7/2007 | Khin Teo et al. | 118/725 |
| 2008/0026168 A1 * | 1/2008 | Fan et al. | 428/34.1 |

* cited by examiner

*Primary Examiner* — Larry Thrower
*Assistant Examiner* — Xue Liu
(74) *Attorney, Agent, or Firm* — Jennifer L. Riley; Helen M. Galus; Thomas K. McBride, Jr.

(57) ABSTRACT

A mechanically robust, binder-free, inexpensive target for laser synthesis of carbon nanotubes and a method for making same, comprising the steps of mixing prismatic edge natural flake graphite with a metal powder catalyst and pressing the graphite and metal powder mixture into a mold having a desired target shape.

23 Claims, 2 Drawing Sheets

US 9,133,032 B2

FINE-GRAINED TARGETS FOR LASER SYNTHESIS OF CARBON NANOTUBES

ORIGIN OF THE INVENTION

This invention was made in part by employees of the United States Government and may be manufactured and used by or for the Government of the United States of America for governmental purposes without the payment of any royalties thereon or therefor.

FIELD OF THE INVENTION

The present invention relates generally to synthesis of carbon nanotubes, and, more particularly, relates to synthesis of carbon nanotubes using a laser.

BACKGROUND

Carbon nanotubes are allotropes of carbon with a nanostructure that can have a length-to-diameter ratio of up to 28,000,000:1. These cylindrical carbon molecules have novel properties that make them potentially useful in many applications in nanotechnology, electronics, optics and other fields of materials science, as well as potential uses in architectural fields. They exhibit extraordinary strength and unique electrical properties, and are efficient conductors of heat.

One known method of producing carbon nanotubes is laser ablation. In the laser ablation process, a pulsed laser vaporizes a target in a high-temperature reactor while an inert gas is bled into the chamber. The target is a composite of a carbon source (usually graphite or an amorphous carbon powder) and metal catalyst particles (typically a cobalt and nickel mixture). Nanotubes develop on the cooler surfaces of the reactor as the vaporized carbon condenses. A water-cooled surface may be included in the system to collect the nanotubes.

Known art involves pressing and binding targets with a carbon cement (e.g. Dylon GC, Dylon Industries, Inc.). Dylan carbon cement has graphite/carbon blend particles that are approximately 200 micron sized bound with a low surface area lamp black and phenolic resin in furfuryl alcohol as a binder. The large particle size inherent in Dylon produces regions of uncatalyzed target that are large compared to the laser spot. Other known techniques involve pressing conventional graphite or carbon powders that result in structurally weak products. Previous target recipes use metal powders that are sold by chemical supply stores, and are specifically selected for their high purity (typically 99.9%) and not for their particle size.

BRIEF SUMMARY

In at least one embodiment of the present invention, a method for making a target for laser synthesis of carbon nanotubes comprises mixing prismatic edge natural flake graphite with a metal powder catalyst and pressing the graphite and metal powder mixture into a mold having a desired target shape.

In at least one embodiment, the graphite may have a nominal mean particle size of less than about ten microns, and typically about five microns. The metal powder catalyst may have a nominal mean particle size of less than about one micron, and typically about 0.5 micron.

In accordance with embodiments of the present invention, the metal powder catalyst may comprise two transition metals, typically nickel and cobalt and typically in about even amounts. The graphite and metal powder mixture typically comprises less than about twenty percent metal powder catalyst by weight.

In at least one embodiment, the prismatic edge natural flake graphite and metal powder catalyst are typically mixed in a ball mill. The graphite and metal powder mixture can be pressed into a mold having a desired target shape (generally cylindrical) at a pressure of between about 10,000 pounds per square inch and 20,000 pounds per square inch. Additionally, depending upon the mold material being used, higher pressures could be used to form the targets, with pressures up to 100,000 pounds or more a square inch being possible, resulting in useful variations in target densities.

In addition to the methods for making a target for laser synthesis of carbon nanotubes, as described above, other aspects of the present invention are directed to corresponding methods for synthesizing carbon nanotubes and to targets for laser synthesis of carbon nanotubes.

BRIEF DESCRIPTION OF THE SEVERAL VIEWS OF THE DRAWINGS

Figure 1:
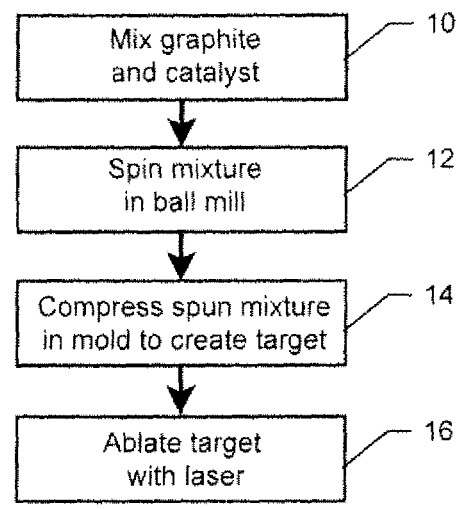
Figure 2:
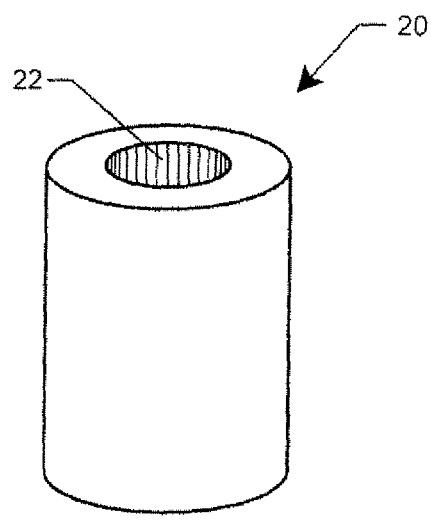
Figure 3:
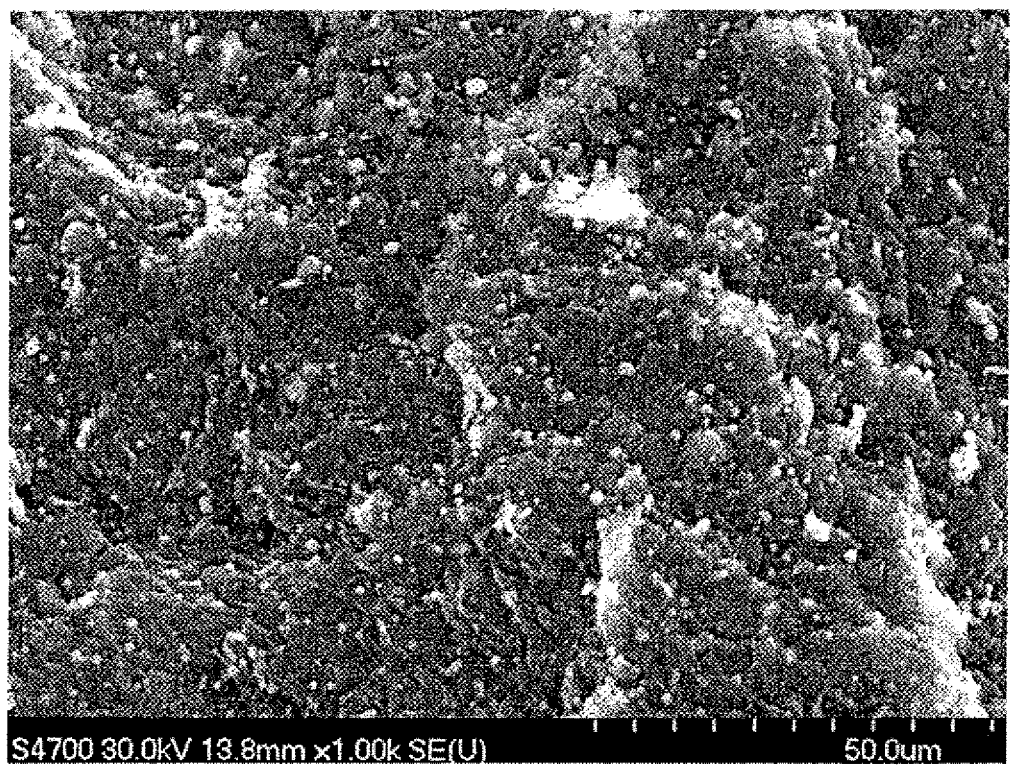

Having thus described the invention in general terms, reference will now be made to the accompanying drawings, which are not necessarily drawn to scale, and wherein:

FIG. 1 is a flowchart of a method of synthesizing carbon nanotube, in accordance with embodiments of the present invention;

FIG. 2 is a perspective view of a target for laser synthesis of carbon nanotubes, in accordance with embodiments of the present invention;

FIG. 3 is a high resolution scanning electron micrograph of a fracture surface of a binder free carbon nanotube target made according to embodiments of the present invention, wherein the metal catalysts appeared as bright round particles and dispersed very uniformly throughout the entire graphite matrix.

DETAILED DESCRIPTION

Embodiments of the present invention comprise a method for making a target for laser synthesis of carbon nanotubes, a method for synthesizing carbon nanotubes, and targets for laser synthesis of carbon nanotubes. The targets can produce high yield carbon nanotubes via laser ablation, such as free electron laser (FEL) ablation.

In at least one embodiment of the present invention, the matrix of the target is a prismatic edge natural flake graphite that produces strong structural pi ($\pi_{p-p}$) bonds when pressed at room temperature. In exemplary embodiments of the present invention, Micro 850 graphite from Asbury Carbons, with a mean grain size of about five microns, was used, although smaller grain sizes may be desirable. The graphite provides the carbon source in the target for nanotube formation. The use of prismatic edge natural flake graphite is advantageous because it locks up under pressure without a binder. Other forms of carbon that have previously been used to make targets have to be bound by wet chemistry and do not provide the small grain size that is desirable. The catalyst used in exemplary embodiments of the present invention can be a powder forge nickel and powder forge cobalt, in substantially equal amounts. These metal powders are small (mean particle size of about 0.5 microns), round in morphology, highly dispersible, and significantly less expensive than chemical supply house metal powders. In exemplary embodiments of the present invention, Umicore ENP 400 Nickel Powder and Umicore HMP Cobalt Powder were employed. FIG. 3 shows a high resolution scanning electron micrograph of a fracture surface of a binder free CNT target made according to embodiments of the present invention. Uniformly dispersed sub-micron round catalyst particles are visible in the micrograph, where inter-particle distance is much smaller than a typical laser spot size. Furthermore, the cost of making such a target can be orders of magnitude less than targets made for conventional carbon nanotube laser synthesis. Target cost is highly significant since the FEL ablation method of carbon nanotube synthesis consumes targets at a rate that is at least two orders of magnitude higher than that of conventional laser synthesis.

Targets of exemplary embodiments of the present invention make use of powder forge metals which are very small (approximately 0.5 micron mean diameter) and designed for dispersability as seen in FIG. 3. The purity is typically less (e.g. 99.5%) than chemical supply house metal powders, but the primary contaminant is carbon (the major constituent of the target) and is therefore not a disadvantage.

Referring now to FIG. 1, a flowchart of a method of synthesizing carbon nanotube is illustrated in accordance with embodiments of the present invention. In exemplary embodiments of the present invention, the graphite and metal powders are mixed in the desired ratio (typically between about five and about twenty percent metal by weight, although the percent of metal may be as low as about one weight percent if uniform and smaller catalyst particles are available) (see block 10). Because of the dispersability of the powders, intimate mingling is easily achieved through a variety of known methods, including low energy ball milling. In one embodiment, a mixing jar is filled three-quarters full with ⅜ inch diameter steel ball bearings, the graphite and metal powders are added to the jar, and the jar is spun at around 1 Hz on a roller type ball mill overnight (see block 12).

The spun mixture is then pressed in a mold at room temperature with a hydraulic press (see block 14). In exemplary embodiments of the present invention, the mold comprises a stainless steel cylinder with a bore the diameter of the desired target, a removable plug in the bottom, and a solid steel ram to compress the charge. The ram may be advanced with a commercial hydraulic press to produce a pressure of about 15,000 pounds per square inch (PSI) in the target, which is generally sufficient to make a structurally sound compact. In one exemplary embodiment, the final targets (element 20 of FIG. 2) were a cylinder with a one inch diameter, a length of up to 2.5 inches, and a 0.25 inch through-hole (element 22) down the axis to allow for a mounting spindle. Final target finishing (hole and surfacing) may be performed on a lathe.

Filling the mold with the graphite and metal powder mixture can be difficult due to the large volume of the unpacked powders. To address this problem, in at least one embodiment, a low pressure packing hopper (which may be made of, e.g., polyvinylchloride (PVC)) may be situated above the mold. This hopper is filled with the unpacked powders, the material is compacted down the bore into the high pressure mold, the hopper is then removed before the high pressure ram is inserted, and final pressing may then be performed in the hydraulic press.

The above described targets may be ablated by a laser to synthesize carbon nanotubes (see block 16 of FIG. 1). For example, the laser may be a free electron laser, a $CO_2$ laser, or a solid state laser (such as an Nd:YAG laser). In an exemplary embodiment of the present invention, brief (sub-picosecond) laser micro-pulses from a free electron laser ablate the target. The beam must be tightly focused (in exemplary embodiments of the present invention, to a spot size of about 150 microns) to achieve ablation threshold. Since the carbon in the target and the catalyst must be released in constant proportions during ablation, the targets must be fine-grained, relative to this dimension. The above-described targets achieve this desired fine-grained consistency, as seen in FIG. 3, a high resolution scanning electron micrograph of a fracture surface of a binder free carbon nanotube target made according to embodiments of the present invention. The metal catalysts appeared as bright round particles and dispersed very uniformly throughout the entire graphite matrix.

Systems and methods for laser synthesis of carbon nanotubes, which may advantageously use the above-described targets, are described in pending U.S. patent application Ser. No. 10/188,525, "Synthesis of Carbon Nanotubes Using High Average Power Ultrafast Laser Ablation," filed Jul. 3, 2002, U.S. patent application Ser. No. 11/589,011, "Laser Ablative Synthesis of Carbon Nanotubes," and U.S. Pat. No. 7,663,007 B1, "Apparatus for the Laser Ablative Synthesis of Carbon Nanotubes" which issued Feb. 16, 2010, the contents of each which are incorporated herein in their entirety.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed as new and desired to be secured by Letters Patent of the United States is:

1. A method of making a target for laser synthesis of carbon nanotubes, the method comprising:
   mixing prismatic edge natural flake graphite with a metal powder catalyst to form a graphite and metal powder mixture that is free of binders; and
   pressing the graphite and metal powder mixture into a mold having a desired target shape to form a mechanically robust binder-free target having a matrix comprising prismatic edge natural flake graphite having structural pi bonds.

2. The method of claim 1, wherein the graphite has a nominal mean particle size of less than about ten microns.

3. The method of claim 1, wherein the graphite has a nominal mean particle size of about five microns.

4. The method of claim 1, wherein the metal powder catalyst has a nominal mean particle size of less than about one micron.

5. The method of claim 1, wherein the metal powder catalyst has a nominal mean particle size of about 0.5 micron.

6. The method of claim 1, wherein the metal powder catalyst comprises two transition metals.

7. The method of claim 6, wherein the two transition metals comprise nickel and cobalt.

8. The method of claim 1, wherein the graphite and metal powder mixture comprises less than about twenty percent metal powder catalyst by weight.

9. The method of claim 1, wherein mixing prismatic edge natural flake graphite with a metal powder catalyst comprises mixing prismatic edge natural flake graphite with a metal powder catalyst in a ball mill.

10. The method of claim 1, wherein pressing the graphite and metal powder mixture into a mold having a desired target shape comprises pressing the graphite and metal powder mixture into a mold at a pressure of between about 10,000 pounds per square inch and about 20,000 pounds per square inch to form a mechanically robust target.

11. The method of claim 1, wherein pressing the graphite and metal powder mixture into a mold having a desired target shape comprises pressing the graphite and metal powder mixture into a mold having a generally cylindrical shape.

12. A method of synthesizing carbon nanotubes, the method comprising:
    providing a target comprising a mixture of prismatic edge natural flake graphite and a metal powder catalyst, the mixture having been pressed into a mold having a desired target shape; and
    ablating the target using a laser wherein the mixture of prismatic edge natural flake graphite and a metal powder catalyst are at least an order of magnitude smaller than a laser ablated spot dimension.

13. The method of claim 12, wherein ablating the target using a laser comprises ablating the target using a free electron laser activated for sub-picosecond pulses and focused to a spot size of less than about 250 microns.

14. The method of claim 13, wherein the laser is focused to a spot size of about 150 microns.

15. The method of claim 12, wherein the graphite has a nominal mean particle size of less than about ten microns.

16. The method of claim 12, wherein the graphite has a nominal mean particle size of about five microns.

17. The method of claim 12, wherein the metal powder catalyst has a nominal mean particle size of less than about one micron.

18. The method of claim 12, wherein the metal powder catalyst has a nominal mean particle size of about 0.5 micron.

19. The method of claim 12, wherein the metal powder catalyst comprises two transition metals.

20. The method of claim 19, wherein the two transition metals comprise nickel and cobalt.

21. The method of claim 12, wherein the graphite and metal powder mixture comprises less than about twenty percent metal powder catalyst by weight.

22. The method of claim 12, wherein the provided target has a generally cylindrical shape.

23. The method of claim 12, wherein ablating the target using a laser comprises ablating the target in an exposed spot where the metal powder catalyst is dispersed substantially uniformly.

* * * * *